(12) United States Patent
McDonald

(10) Patent No.: US 7,096,959 B2
(45) Date of Patent: Aug. 29, 2006

(54) SYSTEM AND METHOD FOR PROVIDING A RENEWABLE SOURCE OF SPRING WATER FOR HUMAN CONSUMPTION

(76) Inventor: Shane D. McDonald, 497 W. Grand River, Okemos, MI (US) 48864

(*) Notice: Subject to any disclaimer, the term of this patent is extended or adjusted under 35 U.S.C. 154(b) by 177 days.

(21) Appl. No.: 10/708,118

(22) Filed: Feb. 10, 2004

(65) Prior Publication Data

US 2005/0173124 A1 Aug. 11, 2005

(51) Int. Cl.
*E03B 3/06* (2006.01)
(52) U.S. Cl. ..................................... 166/369
(58) Field of Classification Search ............... 166/268, 166/369; 405/128.25, 128.3, 128.35
See application file for complete search history.

(56) References Cited

U.S. PATENT DOCUMENTS

| | | | |
|---|---|---|---|
| 2,046,319 A * | 7/1936 | Bulkeley ....................... 62/98 |
| 3,498,077 A | 3/1970 | Gerard et al. | |
| 3,931,851 A | 1/1976 | Harris et al. | |
| 4,232,523 A | 11/1980 | Derby et al. | |
| 4,248,305 A | 2/1981 | Scarbrough et al. | |
| 4,306,940 A | 12/1981 | Zenty | |
| 4,351,651 A | 9/1982 | Courneya | |
| 4,606,794 A | 8/1986 | Wyckoff | |
| 4,676,068 A | 6/1987 | Funk | |
| 4,734,167 A | 3/1988 | Goeldner | |
| 4,869,067 A | 9/1989 | Sears | |
| 4,921,580 A | 5/1990 | Martes et al. | |
| 5,106,512 A | 4/1992 | Reidy | |
| 5,149,446 A | 9/1992 | Reidy | |
| 6,505,477 B1 | 1/2003 | Smith et al. | |
| 6,811,353 B1 * | 11/2004 | Madison ....................... 405/41 |
| 2004/0244398 A1 * | 12/2004 | Radermacher et al. ......... 62/285 |
| 2005/0044862 A1 * | 3/2005 | Vetrovec et al. ............... 62/93 |

FOREIGN PATENT DOCUMENTS

| JP | 354116381 A | 9/1979 |
|---|---|---|
| JP | 11-229450 | * 11/1999 |

* cited by examiner

*Primary Examiner*—William Neuder
(74) *Attorney, Agent, or Firm*—Jerome R. Drouillard

(57) ABSTRACT

A system and method for providing a renewable source of spring water includes a spring well for withdrawing spring water from an aquifer, and a condenser for condensing water from the atmosphere. The condensed water is placed into the aquifer from which the spring water was withdrawn, so as to maintain the water level in the aquifer, but without causing a deterioration in the quality of water within the aquifer.

31 Claims, 4 Drawing Sheets

SYSTEM AND METHOD FOR PROVIDING A RENEWABLE SOURCE OF SPRING WATER FOR HUMAN CONSUMPTION

BACKGROUND OF INVENTION

1. Field of the Invention

The present invention relates to a system and method for renewably withdrawing potable spring water from an aquifer.

2. Disclosure Information

Consumption of spring water, as opposed to sodas and other beverages, has steadily increased with time. Spring waters are highly desirable because the purity and absence of undesirable additives. Unfortunately, the availability of desirable spring waters is limited. A first limitation arises from the fact that to be identified as "spring water", the aquifer from which the spring water is withdrawn must have a demonstrable hydrological connection with surface water. This limits the sites from which spring water may be acquired. Another limitation arises from the obvious implication of withdrawing large quantities of spring water from an aquifer—the level of the water within the aquifer and the corresponding level of surface water within the aquifer may be adversely affected. A system and method according to the present invention provides replacement water, in the form of condensed atmospheric water, which will replace spring water withdrawn from the aquifer, without any sort of contamination of the aquifer, and without changing the quality of the spring water within the aquifer. The present method and system thus solves problems which would otherwise occur were the ground water in communication with the spring water to be merely augmented by mineral laden water pumped from a deeper or different portion of an aquifer or perhaps from an entirely different aquifer that could also be adversely affected by the augmentation withdrawal.

U.S. Pat. Nos. 3,498,077, 4,351,651 and 5,149,446, all disclose means for removing water from the atmosphere, with the '651 patent disclosing a ground cooling structure in which air is passed through tubes within the ground or a body of water, with the resulting condensate being collected. Each of these patents is hereby incorporated by reference into this specification. None of these patents either teaches or suggests the use of condensed atmospheric water for the purpose of supplementing water withdrawn from an aquifer.

SUMMARY OF INVENTION

A method for extracting spring water and for recharging an aquifer from which the spring water has been extracted includes the steps of withdrawing spring water from an aquifer, condensing water from the atmosphere and placing the condensed water into the aquifer from which the spring water was withdrawn. The condensed water is preferably injected into groundwater in the vicinity of the site from which the spring water was withdrawn. The condensed water may also be discharged to surface water in the vicinity of the site from which the spring water was withdrawn. As used herein, the term "aquifer" means a contiguous body of water which may extend both underground and associated surface water.

According to the present method and system, spring water may be extracted from a well. The bore of the well may be at least partially cased.

According to another aspect of the present invention, the water used to supplement water withdrawn from the aquifer may be condensed from the atmosphere by passing air through a condenser which has been chilled by passing groundwater through the condenser. The groundwater used to achieve condensation of the atmospheric water may be withdrawn from a hydraulically separate aquifer or remote portion of the spring aquifer, as opposed to the aquifer, or portion of an aquifer, from which the spring water is withdrawn. As used herein, the term "hydraulically separate" means two portions of an aquifer between which there is no significant intermixing. For example, the portions may be separated by an impermeable stratum. Or, the aquifer portions may flow in a laminar fashion such that there is little potential for intermixing. The groundwater intake well and groundwater discharge well used for operating a condenser according to the present invention are preferably separated by at least a six-month flow distance. In cases where an impermeable stratum is not available, the removal and re-injection of groundwater used for cooling a condenser may be accomplished by placing the withdrawal and re-injection sites in locations which are hydraulically separate due to considerations other than the presence of an impermeable stratum.

As an alternative to using deep ground water as a working fluid in a condenser according to the present invention, ground water may be used as a heat sink in a refrigeration cycle.

According to the present invention, a system for providing a renewable source of potable spring water includes an extraction structure for withdrawing spring water from an aquifer, a condenser for condensing water from the atmosphere and an injection structure for placing the condensed water into the aquifer from which the spring water was withdrawn, including associated surface water bodies. The extraction structure may comprise a drilled well, and the injection structure may comprise a first conductor for placing condensed water into groundwater, and a second conductor for placing condensed water into a surface body of water.

It is an advantage of the present invention that the condensed atmospheric water is placed into the aquifer from which the spring water was withdrawn, so as to maintain the water level in the aquifer, but without causing a deterioration in the quality of water within the aquifer which could otherwise result were groundwater of a lesser quality to be injected into the aquifer to replace the withdrawn spring water.

It is a further advantage of the present invention that condensed atmospheric water produced according to the present invention may be used for the purpose of offsetting seasonal fluctuations in the level of such water bodies as recreational lakes.

It is a further advantage of the present invention that the quantity of condensed atmospheric water placed into said aquifer may be adjusted to offset adverse effects caused by spring water extraction during low flow periods.

Other advantages, as well as objects and features of the present invention, will become apparent to the reader of this specification.

DETAILED DESCRIPTION

Figure 1:
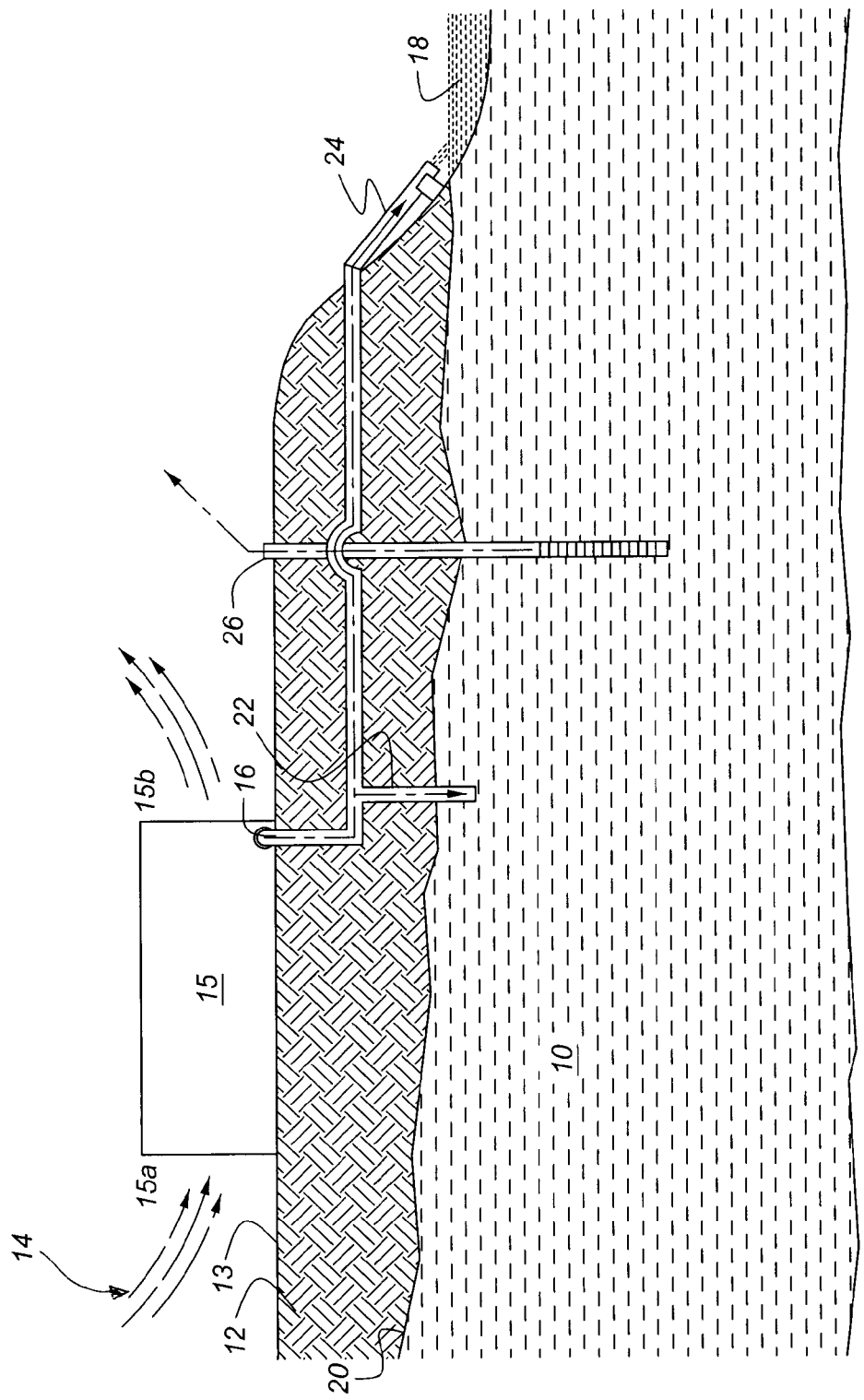
FIG. 1 is a schematic representation of a first embodiment of a system according to the present invention, in which a condenser provides atmospheric water to replace spring water withdrawn from an aquifer.

As shown in FIG. 1, spring water 10 within spring aquifer 12 is withdrawn by means of spring well 26. Spring well 26 may be a drilled well with an inlet located below water table 20 in a saturated zone extending below the water table. Condenser 15 is mounted on the surface of the ground 13 and humid air 14 is conducted through condenser 15 from face 15a to face 15b. Those skilled in the art will appreciate in view of this disclosure that condenser 15 could be situated below ground, so as to minimize noise emissions from the condenser, while providing a measure of direct ground cooling. In any event, condensed atmospheric water 16 flows through ground conductor 22, which is a first conductor for placing condensed water 16 into ground water 10. Condensed water 16 also flows through lake conductor 24 which comprises a second conductor for placing the condensed water into surface water 18. If condenser 15 is sized properly, taking into account normal atmospheric water content, it is possible to compensate for all of spring water 10 withdrawn through spring well 26 by making up sufficient condensed water and supplying it to spring aquifer 12. If desired, the quantity of condensed atmospheric water could exceed the quantity of spring water withdrawn. As yet another alternative, condenser 15 could be sized so as to generate only the amount of water needed to offset the adverse effects of withdrawals during low-flow periods.

Figure 2:
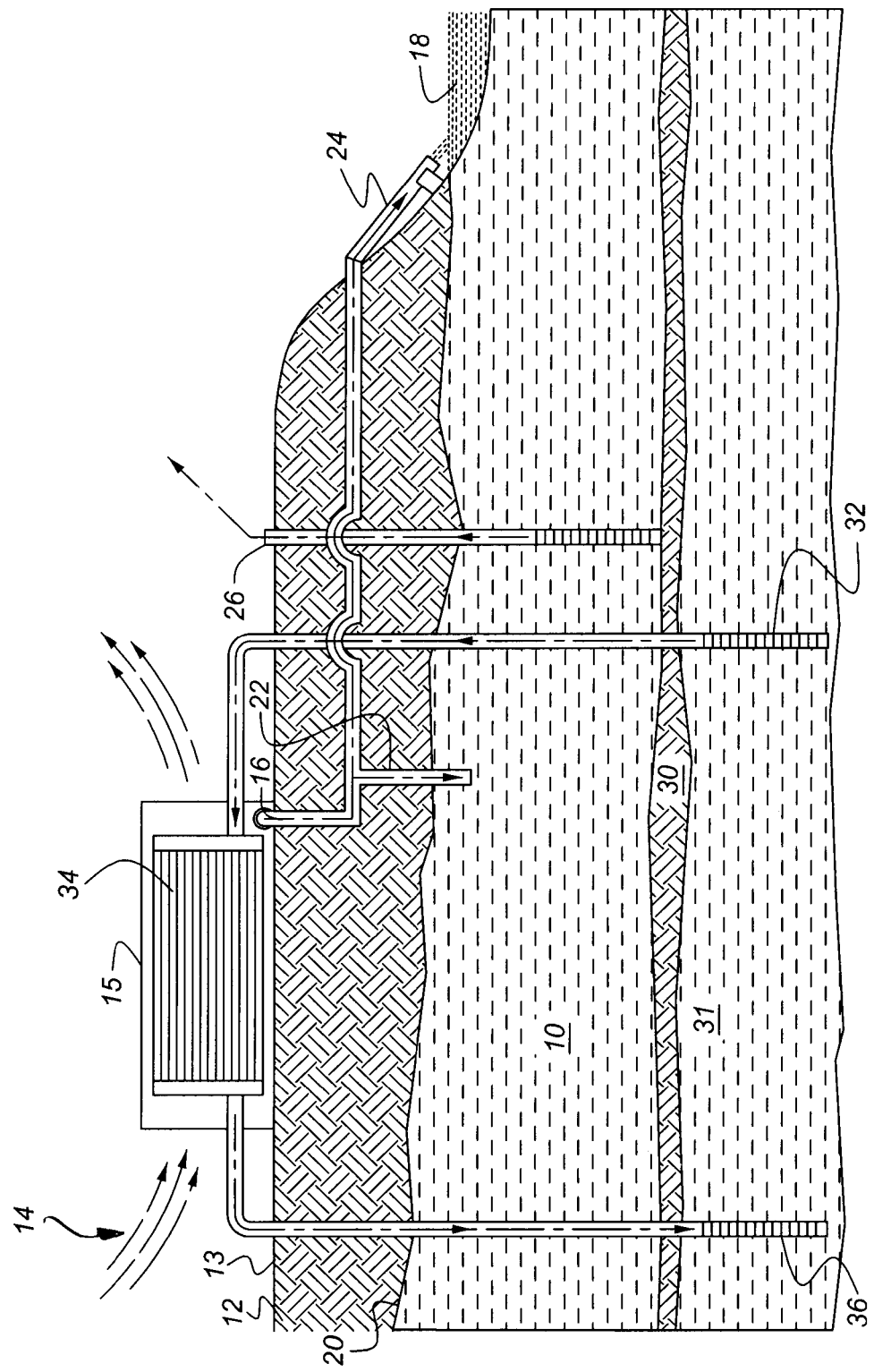
FIG. 2 is a second embodiment in which a condenser for producing atmospheric water is chilled by ground water drawn from an aquifer at a level below a level at which spring water is being withdrawn.

FIG. 2 illustrates a second embodiment of the present invention in which condenser 15 has a plurality of ground water conduits 34 extending therethrough. Groundwater is lifted by groundwater intake well 32 from a hydraulically separate aquifer 31, which is separated from spring aquifer 12 by hydraulically isolating low-permeability stratum 30. The groundwater is then passed through groundwater conduits 34 within condenser 15, wherein the cold groundwater absorbs heat from the humid air flowing over the exterior surfaces of conduits 34, thereby causing condensation of atmospheric moisture. After passing through conduits 34, the groundwater is discharged through groundwater discharge well 36. In geographic areas wherein atmospheric temperatures drop below groundwater temperatures during some months, groundwater intake well 32 and discharge well 36 are separated by approximately a six-month equivalent time of travel for the groundwater flow. This means that water injected into aquifer 31 through discharge well 36, which is upgradient from intake well 32, will take about six months to flow into the vicinity of intake well 32. This ensures that, given an annual operation cycle, groundwater being re-injected during the summer by means of groundwater discharge well 36 will become fully chilled when it is picked up by intake well 32 and re-injected during colder months. This will permit the water to be at an optimal temperature when it is picked up during summer months by intake well 32. In essence, the groundwater used for cooling condenser 15 will be withdrawn from and re-injected to a portion of an aquifer which is remote from the location of spring well 26.

It may be desirable with the embodiment of FIG. 2 that impermeable stratum 30 extend between spring well 26 and lower aquifer 31. This prevents older water, which may contain large quantities of undesirable dissolved minerals, from mixing with young water contained within spring aquifer 12 above impermeable stratum 30. This will prevent degradation of the quality of spring water 10 withdrawn by means of spring well 26.

Figure 3:
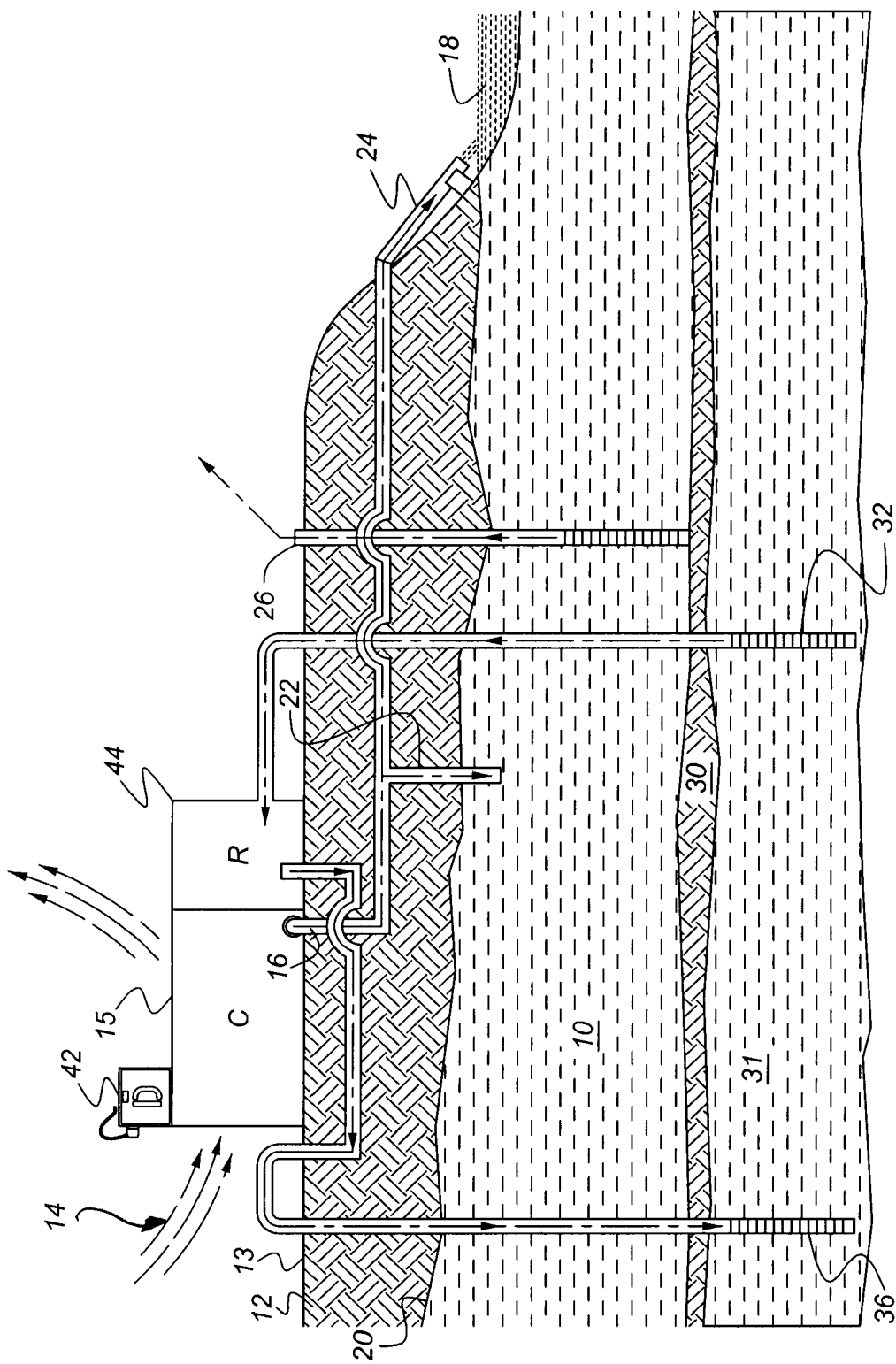
FIG. 3 is a third embodiment in which a condenser is operated with a refrigeration cycle utilizing ground water as a heat sink for the refrigeration cycle.

FIG. 3 illustrates a third embodiment according to the present invention in which condenser 15 is operated with refrigeration section 44, which uses groundwater from intake well 32 to chill air passing through condenser section C, and thereby remove moisture from the air, as previously discussed. After absorbing heat from refrigeration section 44, the groundwater is returned to aquifer 31 by means of discharge well 36. Because a refrigeration cycle is used, condenser 15 also has power supply 42 associated therewith. Those skilled in the art will appreciate in view of this disclosure that the power supply could comprise electrical service only, or alternatively, could comprise both electricity and gaseous fuel service.

Figure 4:
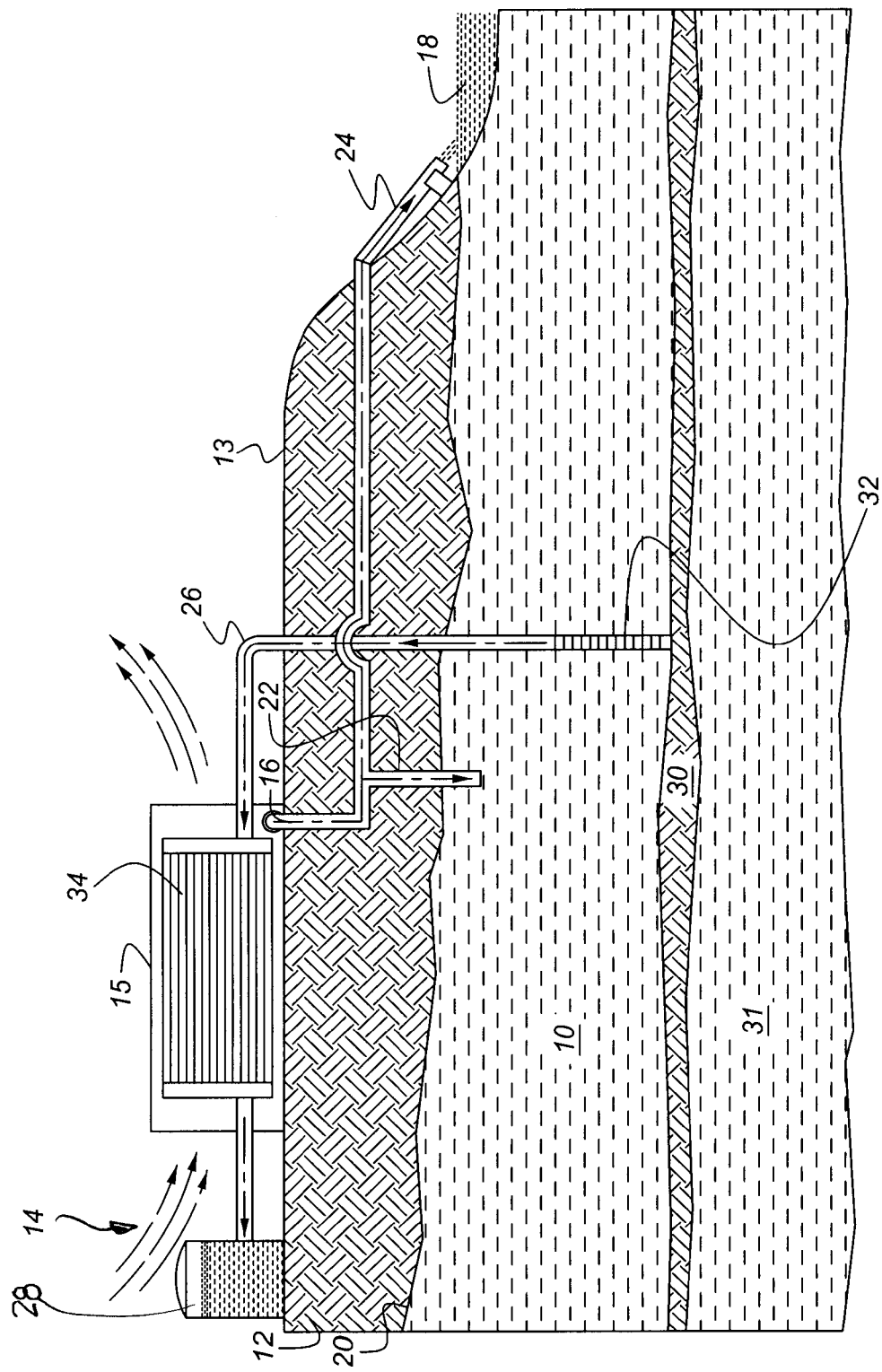
FIG. 4 is a fourth embodiment in which a condenser is chilled by spring water which is then further processed without being returned to the ground.

FIG. 4 illustrates a fourth embodiment in which spring water well 26 furnishes spring water 10 to condenser 15. After passing through conduits 34, spring water 10 will flow into either storage tank 28, or into another structure such as a pipeline, for further processing (not shown). In the embodiment of FIG. 4, spring water 10 may be used for either direct cooling of the air drawn into condenser 15, or as a heat sink for a refrigeration cycle, as shown in FIG. 3. The present embodiment is particularly useful for conditions in which lower aquifer 31 may be either of insufficient capacity, or indeed, nonexistent.

The usefulness of the embodiment of FIG. 4 is further illustrated by the fact that in certain cases extracted spring water is sufficiently cold that it must be heated upon entering the bottling plant so as to obviate problems associated with condensation forming on plant machinery and other surfaces. Finally, the embodiment of FIG. 4 eliminates the need for separate wells and pumps for bringing water to the surface solely for the purpose of chilling condenser 15. The condensed water may be returned to aquifer 12 as shown, or to another aquifer which is hydraulically separate from aquifer 12.

Although the present invention has been described in connection with particular embodiments thereof, it is to be understood that various modifications, alterations, and adaptations may be made by those skilled in the art without departing from the spirit and scope of the invention set forth in the following claims.

The invention claimed is:

1. A method for extracting spring water and for recharging an aquifer from which the spring water has been extracted, comprising the steps of:
    withdrawing spring water from an aquifer;
    condensing water from the atmosphere; and
    placing the condensed water into the aquifer from which the spring water has withdrawn, with a portion of said condensed water being injected into groundwater, and a portion being discharged to surface water.

2. A method according to claim 1, wherein a portion of said condensed water is injected into groundwater in the vicinity of the site from which the spring water was withdrawn.

3. A method according to claim 1, wherein a portion of said condensed water is discharged to surface water in the vicinity of the site from which the spring water was withdrawn.

4. A method according to claim 1, wherein said spring water is extracted from a well having a bore which is at least partially cased.

5. A method according to claim 1, wherein water is condensed from the atmosphere by passing air through a condenser which has been chilled by passing groundwater through the condenser.

6. A method according to claim 1, wherein water is condensed from the atmosphere by passing air through a condenser which has been chilled by passing spring water through the condenser.

7. A method according to claim 5, wherein the groundwater passing through the condenser is drawn from an aquifer which is hydraulically separate from the aquifer from which the spring water is withdrawn.

8. A method according to claim 7, wherein the ground water passing through the condenser is injected to a portion of an aquifer which is hydraulically separate form the aquifer from which the groundwater was withdrawn.

9. A method according to claim 7, wherein the groundwater passing through the condenser is drawn from beneath an impermeable stratum lying below the aquifer from which the spring water is withdrawn.

10. A method to claim 9, wherein the groundwater passing through the condenser is discharged from the condenser and injected beneath the impermeable stratum from which it was drawn.

11. A method according to claim 10, wherein the groundwater passing through the condenser is injected beneath the impermeable stratum at a location which is at least a six-month flow distance upgradient from the location at which the groundwater passing through the condenser is withdrawn from beneath the impermeable stratum.

12. A method according to claim 1, wherein water is condensed from the atmosphere by passing air through a condenser which has been chilled by a refrigeration cycle using groundwater as a heat sink.

13. A method according to claim 1, wherein said spring water is extracted from a well.

14. A method according to claim 13, wherein said well is a drilled well.

15. A method according to claim 1, wherein said spring water is extracted from a well having an inlet located above an impermeable stratum, with said condenser being chilled by groundwater drawn from a remote portion of the spring.

16. A method to claim 1, wherein the quantity of condensed atmospheric water placed into said aquifer is approximately equal to the quantity of spring water extracted from said aquifer.

17. A method according to claim 1, wherein the quantity of condensed atmospheric water placed into said aquifer is greater than the quantity of spring water extracted from said aquifer.

18. A method according to claim 1, wherein the quantity of condensed atmospheric water placed into said aquifer is sufficient to offset adverse effects caused by spring water extraction during low flow periods.

19. A system for providing a renewable source of potable spring water, comprising:
   an extraction structure for withdrawing spring water from an aquifer;
   a condenser for condensing water from the atmosphere; and
   an injection structure for placing the condensed water into the aquifer from which the spring water was withdrawn, wherein said injection structure comprises a first conductor for placing condensed water into groundwater beneath a surface of the ground, and a second conductor for placing condensed water into a surface body of water.

20. A system according to claim 19, wherein said extraction structure comprises a drilled well.

21. A system according to claim 19, wherein heat removed from air passing through the condenser is rejected to groundwater flowing through the condenser.

22. A system according to claim 19, wherein said condenser comprises a refrigeration system which rejects heat to groundwater.

23. A system according to claim 22, wherein said refrigeration system rejects heat to groundwater.

24. A system according to claim 22, wherein said groundwater is withdrawn from a first well, after having passed through said refrigeration system, is injected into a second well.

25. A system according to claim 24, wherein said first and second wells are hydraulically separate from the portion of said aquifer from which the spring water is withdrawn from a stratum.

26. A method for extracting potable spring water and for recharging an aquifer from which the spring water has been extracted, comprising the steps of:
   withdrawing spring water from a first portion of an aquifer;
   condensing water from the atmosphere with a condenser chilled by groundwater withdrawn from a second portion of said aquifer which is hydraulically separate from said first portion; and
   placing the condensed water into said first portion of said aquifer.

27. A method according to claim 26, further comprising the step of returning the groundwater passing through the condenser to a location which is hydraulically separate from said aquifer.

28. A method for recharging an aquifer, comprising the steps of:
   withdrawing water from an aquifer;
   condensing water from the atmosphere with a condenser chilled by passing the water withdrawn form the aquifer through the condenser; and
   placing the condensed water into the aquifer.

29. A method according to claim 28, further comprising the step of returning the groundwater passing through the condenser to a location which is hydraulically separate from the point at which the water is withdrawn from the aquifer.

30. A method according to claim 28, further comprising the step of returning the groundwater passing through the condenser to a location which is hydraulically connected with the point at which the water is withdrawn from the aquifer.

31. A method for extracting water from a surface water body and for recharging the source water body from which the water has been extracted, comprising the steps of:
   withdrawing water from said surface water body;
   condensing water from the atmosphere; and
   placing the condensed water into said surface water body.

* * * * *